United States Patent [19]
Dreisin

[11] 3,991,732
[45] Nov. 16, 1976

[54] FUEL INJECTION TIMING CONTROL
[75] Inventor: Alexander Dreisin, Olympia Fields, Ill.
[73] Assignee: Allis-Chalmers Corporation, Milwaukee, Wis.
[22] Filed: Nov. 28, 1975
[21] Appl. No.: 636,169

[52] U.S. Cl.............. 123/140 R; 123/139 AB; 123/139 AP
[51] Int. Cl.² ................. F02M 59/28; F02M 59/20
[58] Field of Search...... 123/140 R, 139 R, 139 AB, 123/139 AP

[56] References Cited
UNITED STATES PATENTS
3,847,126  11/1974  Dreisin .................... 123/140 R Primary Examiner—Robert G. Nilson
Attorney, Agent, or Firm—Arthur L. Nelson

[57] ABSTRACT
A fuel injection control linkage for timing and metering fuel injection on a multiple plunger fuel injection pump with modulation responsive to engine speed and engine load.

10 Claims, 6 Drawing Figures

FUEL INJECTION TIMING CONTROL

This invention relates to a multiple plunger fuel injection pump and more particularly to injection timing on a multiple plunger fuel injection pump for retarding injection when load decreases from full load to part load and advancing of fuel injection for further decrease in load.

A multiple plunger fuel injection pump is disclosed in the U.S. Pat. No. 3,847,126 entitled "Injection Timing Modulator" by Alexander Dreisin. The timing and metering of this fuel injection pump operates responsive to speed and load of the engine.

It is advantageous to change the injection timing as a function of engine load as well as engine speed. It is proposed to introduce into the injection pump a cam mechanism which would retain a variable injection timing as a function of engine speed but would allow modification of the injection timing as a function of engine load as well.

In optimizing the gaseous exhaust omissions of the diesel engines, it has been advantageous to change start of fuel injection at a given engine speed as functions of engine load. For example, on many direct injection engines it is advantageous to retard the injection when the engine load decreases from 100% to approximately 50%, and then, to start advancing the start of injection again as the load decreases further from 50% towards zero.

It is an object of this invention to provide a control linkage for a multiple plunger fuel injection pump having fuel metering and timing means with means for modifying the timing as a function of engine load.

It is another object of this invention to provide a control linkage and cam means for a multiple plunger fuel injection pump with means for modulating the timing responsive to engine load.

It is a further object of this invention to provide a multiple plunger fuel injection pump with a dephasing linkage between the governor and the control rod for controlling the timing and quantity of fuel injection with modulation of the fuel injection according to engine speed and engine load.

The objects of this invention are accomplished in a multiple plunger fuel injection pump having a cam shaft driving a plurality of plungers. The plungers pressurize fuel for transmission through fuel delivery valves to a plurality of combustion chambers. A plurality of control sleeves are connected to a single control rod which can reciprocate and rotate the sleeves to vary initiation and termination of fuel injection. A governor driven in proportion to engine speed operates to drive a drive arm on a centrally pivoted lever. The centrally pivoted lever also has a timing arm and a quantity control arm with suitable linkages connected between the arms and the control rod to provide the timing and quantity of fuel delivery required. Also a throttle linkage is connected between the quantity control arm and the control rod which varies the quantity of fuel injected in response to movement of the throttle linkage. Accordingly, the centrally pivoted lever modulates fuel injection in response to engine speed and a manual throttle control for providing the proper torque requirements in accordance with the load applied to the engine.

Included in the timing linkage is a variable fulcrum lever pivotally mounted on an eccentric pin which is integral and eccentric with the shaft which supports the pin. The shaft has provisions for rotating the pin to vary the fulcrum point of the lever. The timing arm drives through a drive link to the variable fulcrum lever. A clevis on the drive link operates through an engaging pin on the variable fulcrum lever and the opposite end of the variable fulcrum lever is connected with the timing link. The variable fulcrum lever is pivoted near the middle of its length on the eccentric pin which is mounted in the housing and is connected to an outside lever to vary the fulcrum point of the lever. This provides a variable modulation of the timing of fuel injection.

The preferred embodiment of this invention is illustrated in the attached drawing.

Figure 1:
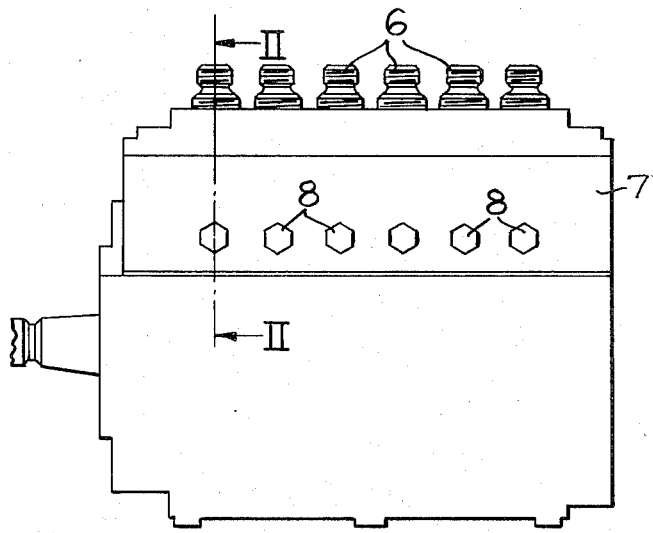
FIG. 1 is a side view of a multiple plunger fuel injection pump.

Referring to the drawings the preferred embodiment is illustrated which shows a multiple plunger fuel injection pump.

Figure 6:
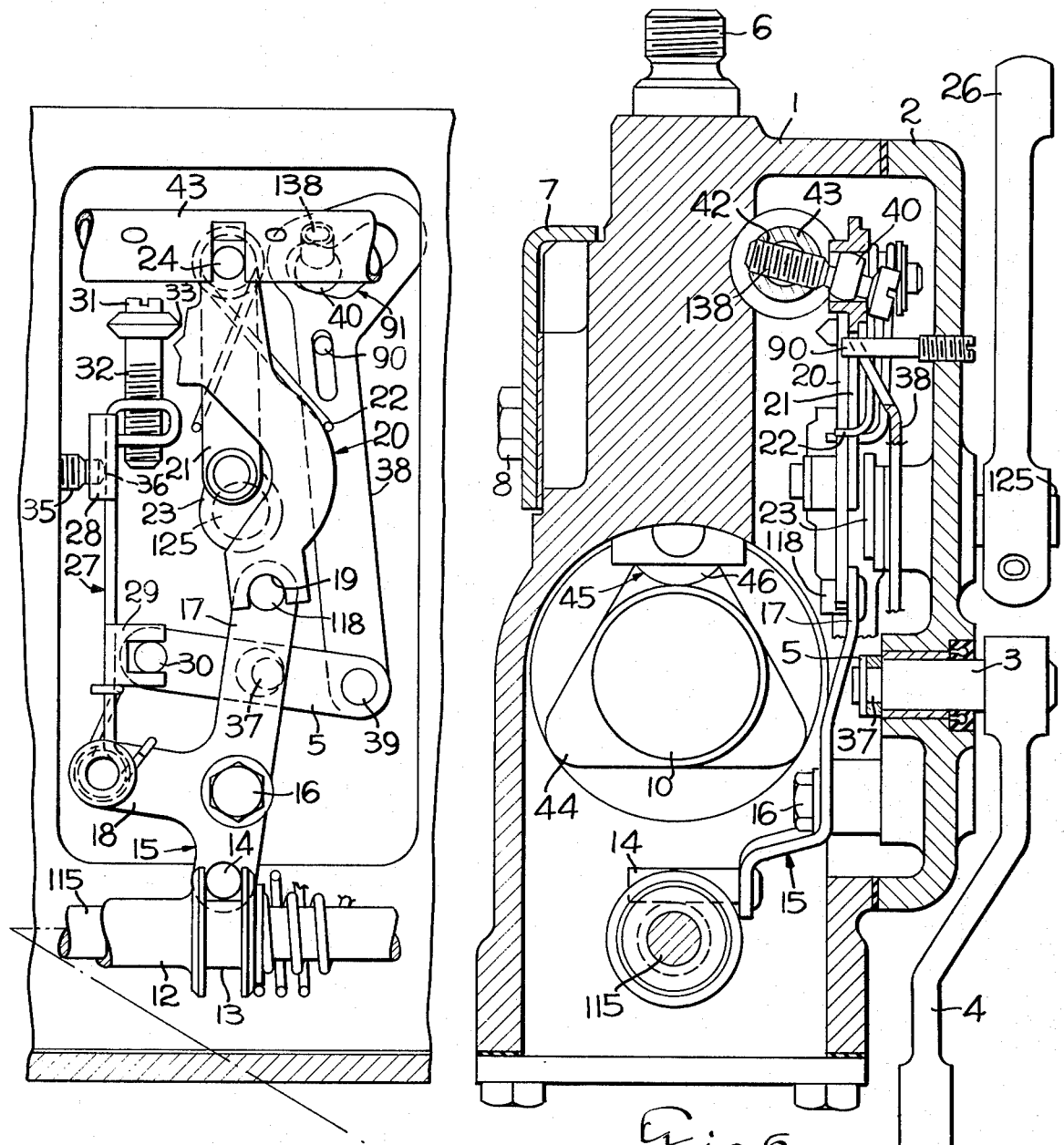
FIG. 6 is a cross section view taken at right angles to FIG. 5 showing the control linkage shown in FIG. 5.
Figure 5:
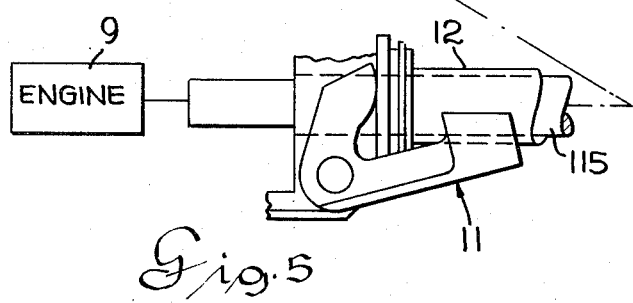
FIG. 5 is a cross section view showing the control linkage.

FIGS. 5 and 6 show cross section views of the multiple plunger fuel injection pump. A timing modulator shaft 3 which is integral with the eccentric pin 37 is supported for pivotal movement in the cover 2. Shaft 3 carries the lever 4 for rotating the shaft 3 and controlling the position of the pivot point for the variable fulcrum lever 5.

The pump housing 1 supports a plurality of fuel pumping assemblies discharging fuel through the fittings 6 in the upper portion of the pump housing. A cover plate 7 is fastened by a plurality of bolts 8 which covers the calibration mechanisms shown in FIG. 2.

The multiple plunger fuel injection pump is driven by an engine 9 which drives the cam shaft 10 to operate a plurality of cams which selectively operate plungers to pressurize fluid in the pumping chambers for injection into the engine. The engine also drives a governor 11 which is a conventional flyball type of mechanical governor which shifts sleeve 12 responsive to the speed of the engine. The sleeve 12 forms an annular groove 13 which receives the pin 14 on the drive lever 15. The governor as shown in FIG. 5 is used in drive mechanisms for FIG. 5 and 6.

When the governor is in operation the sleeve 12 reciprocates on the shaft 115 to pivot the drive lever 15 about the bolt 16. The drive lever 15 has a quantity control arm 17 and a timing control arm 18. Quantity control arm 17 carries the pin 118 which is received in a slot 19 of the torque link 20. The torque link 20 is pivotally connected to control rod 43 by the pin 24. A throttle link 21 is also pivotally connected to the pin 24. The torque link 20 and the throttle link 21 are biased to a parallel position by the spring 22. Throttle link 21 is connected to the throttle arm 23 on the throttle shaft 125. The throttle shaft 125 is connected to a throttle linkage. The throttle lever 26 is connected to the throttle shaft 125 and forms a part of the throttle linkage which is manually controlled during operation of the engine.

The drive link 27 includes an arm 28 which forms a clevis 29 which receives the pin 30. The upper end of the drive link 27 includes a torque screw 31 which can be adjusted by means of a threaded portion 32 received in a threaded opening of end portion of the link 28. The pivot point 33 of the head of the torque screw 31 forms a pivot point for the torque link 20 when the linkage is in operation.

The screw 35 is adjustably screwed into the pump housing and forms a variable pivot point 36 upon which the drive link 27 rests when it is in operation.

The variable fulcrum lever 5 is pivotably supported on a pin 37 which is integral with shaft 3 which rests in the governor cover 2. The shaft 3 is connected to the lever 4 to vary the fulcrum point of the lever 5. The timing link 38 is pivotally connected by the pin 39 to the variable fulcrum lever 5. The upper end of the timing link 38 carries a pin 138 which has a spherical head 40 received in a timing link 38. The pin 138 has a threaded portion 42 that threadedly engages the control rod 43.

Figure 2:
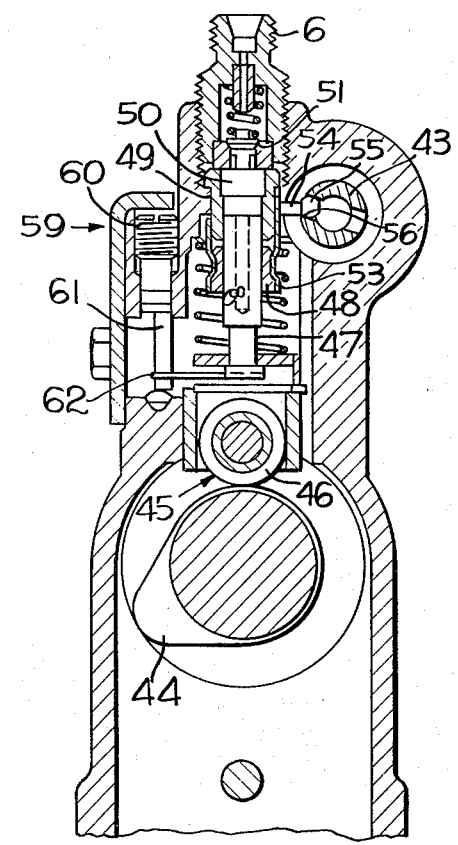
FIG. 2 is a cross section view taken on line II—II of FIG. 1.

The cam shaft 10 carries a plurality of cams as shown in FIGS. 2 and 6. The cam 44 drives the follower 45. The follower 45 includes the roller 46 which is shown operating on the base circle of the cam 44 in FIG. 2. The cam follower drives the plunger 47. The plunger 47 reciprocates within the control sleeve 48 and reciprocates within the barrel 49. The barrel 49 and the plunger 47 form the high pressure pumping chamber 50. The upper end of the pumping chamber discharges fuel through the fuel delivery valve 51 in the fitting 6. The control sleeve 48 is carried by the retainer sleeve 53. The retainer sleeve 53 is connected to the pin 54 having a head 55 which is received within the cylindrical opening 56 of the control rod 43. Movement of the control sleeve 48 is controlled by the control rod 43 and the control linkages in response to the speed of governor 11.

Figure 3:
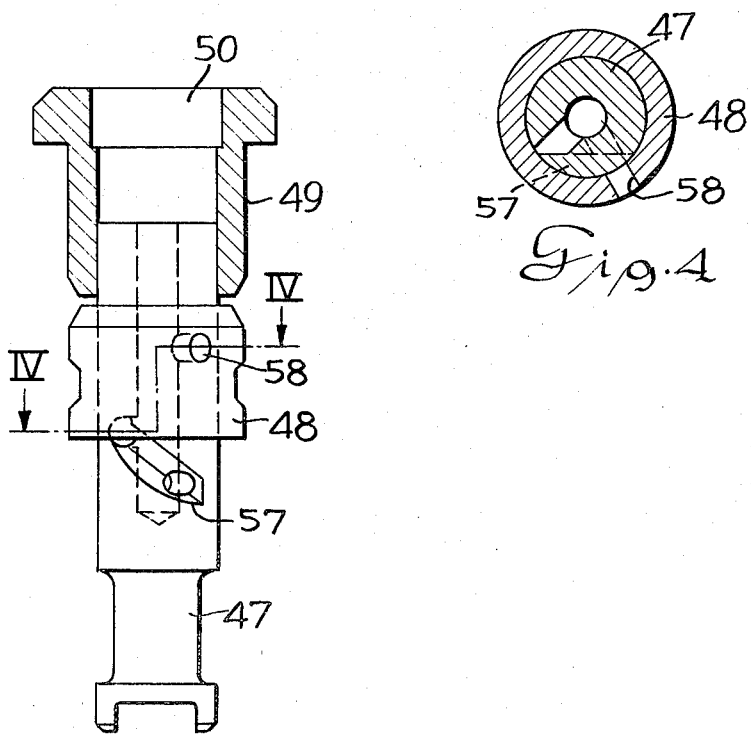
FIG. 3 is a view of the barrel and plunger together with the control sleeve.
Figure 4:
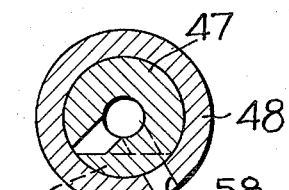
FIG. 4 is a cross section view taken on line IV—IV of FIG. 3.

The start of injection occurs when the lower edge of the metering helix 57 in FIG. 3 on the plunger 47 registers with the lower edge of the control sleeve 48. Advancing the start of fuel injection is accomplished by lowering the control sleeve. Retardation of fuel injection or timing of fuel injection is accomplished by raising the sleeve 48 relative to the plunger 47. The timing advance and retardation is a function of engine speed and can be varied by engine load as will be seen subsequently in the description. The engine speed controls the governor reaction and through the control linkage controls the control rod which moves the control sleeve axially relative to the plunger.

Pin 90 positioned in the pump housing protrudes through a slot in link 38 allowing the latter to move up and down but not sideways.

The quantity control of fuel is responsive to the speed of the engine and also to the throttle control and engine load. These functions are fed into the control linkage which are then transferred to the control rod to reciprocate the control rod in a manner to rotate the control sleeve clockwise or counterclockwise relative to the plunger. Termination of fuel injection is effective when the helical slot 57 registers with the spill port 58 in the control sleeve. Duration of fuel injection is controlled by rotating the control sleeve 48 so that the helical slot 57 comes in registry with the spill port 58 early or later depending on the speed of the engine and the setting of the throttle control and the modulating control.

The calibration mechanism for the fuel injection pump includes a calibration unit 59 as shown in FIG. 2. Rotation of the calibration screw 60 rotates the eccentric pin 61 in the fork 62 to rotate the plunger 47 for advance or retard of the spill port opening. For a more detailed description of the operation of the fuel injection pump and the calibration unit reference may be had to U.S. Pat. Nos. 3,714,936; 3,714,935 and 3,667,437 by Alexander Dreisin.

The operation of the linkage and fuel injection pump will be described in the following paragraphs.

As the engine 9 is in operation the governor 11 will also be driven at a rate of speed in proportion to that of the engine. The rate of speed of the governor controls the movement of the governor sleeve 12 which reciprocates on the shaft 115. Pin 14 carried in the recess 13 pivots the drive lever 15 on its pivotal axis. This in turn moves the quantity control arm 17 and the timing control arm 18. The quantity control arm 17 pivots the torque link 20 about the axis of the pin 118. The opposite end of the torque link 20 is connected to the pin 24 which causes the control rod 43 to reciprocate on its axis depending in part on the speed of the engine.

The throttle lever 26 is a manually controlled lever which rotates the throttle arm 23 which is connected to the throttle link 21 which also in part controls the magnitude of reciprocation of the control rod 43. The spring 22 biases the torque link 20 and the throttle link 21 toward a parallel position which in turn tends to operate the two levers for joint control of the operation of the control rod.

As the speed of the engine increases the governor speed also increases causing the governor sleeve 12 to move in the right-hand direction. Drive lever 15 rotates counterclockwise which causes the timing arm 18 to move downwardly and the variable fulcrum lever 5 to pivot upwardly on the right-hand end of the lever as viewed in FIG. 5. This in turn rotates the control rod 43 on its axis and causes the control rod to move the control sleeve 48 downwardly on the plunger 47 and advance fuel injection. Reverse action is created when there is a decrease in speed and the timing is retarded accordingly.

When the timing modulator shaft 3 is rotated by lever 4 the eccentric pin 37 is raised, this in turn raises timing link 38. The timing link 38 transmits an upward rotational movement to the control rod which in turn lowers the control sleeve advancing the injection timing. The modulating of fuel injection timing by rotating the shaft 3 on its axis to move pin 37 permits either advance or retard of the timing of the fuel injection.

When the speed of the engine is kept constant but engine load starts decreasing due to change in throttle position, the movement of the governor yoke assembly 20 causes the control member 43 to move away from the wide open position to the right (FIG. 5). In this case, the position of timing link 38 does not change but the spherical end of timing pin 138 follows the profile of groove 91. If the form of the groove is as shown in FIG. 5, pin spherical end 40 will first move downward causing the start of injection to retard and then, when an engine load is further decreased, the direction will be reversed. The spherical end will now start moving upward, advancing the injection increasingly as the load is further cut down.

Changing the shape of groove 91 would allow a wide choice of injection timing program as function of load.

The embodiments of the invention in which an exclusive property or privilege is claimed are defined as follows:

1. A multiple plunger fuel injection pump for an internal combustion engine comprising, a pump housing means defining a plurality of bores, a plunger received in each of said bores and defining a fuel injection pumping chamber, means defining a fuel supply chamber, each of said plungers defining passage means selectively communicating between the supply chamber and the injection pumping chamber for supplying fuel to said injection pumping chamber, a control sleeve mounted for reciprocal and rotational movement about each of said plungers and defining port means with said plunger for controlling the closing and opening of said passage means in said plunger between the supply chamber and the fuel injection pumping chamber, means sequentially reciprocating each of said plungers in said bores for pumping fuel in said fuel injection pumping chamber, a speed responsive device adapted for connection to an engine including a control member moving in response to engine speed, a drive lever defining a drive arm, a timing arm and a quantity control arm, means connecting said drive arm to said control member of said speed responsive device, a control rod connected to each of said control sleeves providing rotational and reciprocating movement of said control sleeves, a quantity control linkage connected between said quantity control arm and said control rod reciprocating said control rod and rotating said control sleeves, a throttle control pivotally connected to said quantity control linkage to modify movement of said control rod in response to movement of said throttle control, a timing linkage connected between said timing arm and said control rod rotating said control rod and reciprocating said control sleeves, a variable fulcrum timing modulation lever in said timing linkage for modifying fuel injection timing, a timing link defining a cam slot means, follower means on said control rod received in said cam slot means modifying the rotational movement of said control rod as said rod is reciprocated, said linkage is thereby controlling the quantity, timing and modulation of fuel delivery of said fuel injection pump.

2. A multiple plunger fuel injection pump for an internal combustion engine as set forth in claim 1 wherein said cam slot means defines a slot in said timing link for retarding fuel injection from full load to part load and advancing fuel injection from part load to no load.

3. A multiple plunger fuel injection pump for an internal combustion engine as set forth in claim 1 including guiding means for guiding said timing link in a generally reciprocating motion, guided means on said timing link engaging said guiding means for generating an essentially reciprocal motion of said timing link.

4. A multiple plunger fuel injection pump for an internal combustion engine as set forth in claim 1 wherein said cam slot means defines a curved slot in said timing link.

5. A multiple plunger fuel injection pump for an internal combustion engine as set forth in claim 1 wherein said follower means defines a pin for engaging said cam slot means.

6. A multiple plunger fuel injection pump for an internal cumbustion engine as set forth in claim 1 wherein said follower means defines a pin forming a spherical head for engaging said cam slot means on said timing link.

7. A multiple plunger fuel injection pump for an internal combustion engine as set forth in claim 1 wherein said cam slot means defines a slot in said timing link, said follower means defines a pin received in said slot for controlling the movement of said timing link.

8. A multiple plunger fuel injection pump for an internal combustion engine as set forth in claim 1 including a slot in said timing link, a pin received in said slot for causing said timing link to move in generally a reciprocal motion as said control rod is reciprocated.

9. A multiple plunger fuel injection pump for an internal combustion engine as set forth in claim 1 including a pin mounted in said housing, a slot in said timing link for causing a generally reciprocal motion of said timing link when said control rod is reciprocated.

10. A multiple plunger fuel injection pump for an internal combustion engine as set forth in claim 1 wherein said cam slot means defines a cam slot in said timing link, said follower means defines a pin having a spherical head received in said cam slot for causing said control rod to advance and retard fuel injection as a control rod is reciprocated.

* * * * *